(12) United States Patent
Baron et al.

(10) Patent No.: US 12,021,820 B2
(45) Date of Patent: *Jun. 25, 2024

(54) MESSAGING SYSTEM OF PARTIAL AND OUT-OF-ORDER EVENTS

(71) Applicant: Snap Inc., Santa Monica, CA (US)

(72) Inventors: Bradley Baron, Seattle, WA (US); Benjamin Ralph Hollis, Seattle, WA (US); Gavin Shriver, Seattle, WA (US); Peter Cardwell, Bainbridge Island, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,442

(22) Filed: Jan. 13, 2023

(65) Prior Publication Data

US 2023/0208800 A1 Jun. 29, 2023

Related U.S. Application Data

(63) Continuation of application No. 17/249,899, filed on Mar. 17, 2021, now Pat. No. 11,563,709.

(60) Provisional application No. 63/003,127, filed on Mar. 31, 2020.

(51) Int. Cl.
*H04L 51/52* (2022.01)
*H04L 47/34* (2022.01)
*H04L 47/62* (2022.01)

(52) U.S. Cl.
CPC .............. *H04L 51/52* (2022.05); *H04L 47/34* (2013.01); *H04L 47/6215* (2013.01)

(58) Field of Classification Search
CPC ..... H04L 51/52; H04L 47/34; H04L 47/6215; H04L 51/226
See application file for complete search history.

(56) References Cited

U.S. PATENT DOCUMENTS

| 5,790,772 | A | * | 8/1998 | Badovinatz ......... | G06F 11/1443 709/201 |
|---|---|---|---|---|---|
| 5,799,146 | A | * | 8/1998 | Badovinatz ......... | G06F 11/1443 709/201 |
| 6,493,343 | B1 | * | 12/2002 | Garcia ...................... | H04L 1/22 709/213 |
| 6,823,512 | B1 | * | 11/2004 | Miller ................... | H04L 1/1628 709/201 |

(Continued)

OTHER PUBLICATIONS

"U.S. Appl. No. 17/249,899, Notice of Allowance dated Sep. 20, 2022", 8 pgs.

(Continued)

*Primary Examiner* — El Hadji M Sall

(74) *Attorney, Agent, or Firm* — Schwegman Lundberg & Woessner, P.A.

(57) ABSTRACT

Methods, systems, and computer readable medium are provided for receiving an event message in a plurality of event messages, the event message comprising a sequence number and associated data, identifying the event message as an out-of-order event message based on the sequence number, assigning a priority level to the out-of-order event message based on a plurality of priority rules, and placing the out-of-order event message in a primary queue of messages based on the priority level assigned to the event message.

20 Claims, 14 Drawing Sheets

(56) References Cited

U.S. PATENT DOCUMENTS

| | | | |
|---|---|---|---|
| 8,190,960 B1 * | 5/2012 | Bahadur | H04L 12/56 |
| | | | 714/751 |
| 8,856,807 B1 | 10/2014 | Khapre et al. | |
| 10,853,879 B2 * | 12/2020 | Konduru | G06Q 40/04 |
| 11,055,754 B1 | 7/2021 | Khapre et al. | |
| 2005/0078605 A1 * | 4/2005 | Huang | H04L 9/40 |
| | | | 370/235 |
| 2006/0109857 A1 | 5/2006 | Herrmann | |
| 2008/0091932 A1 | 4/2008 | Mcnutt et al. | |
| 2008/0133283 A1 | 6/2008 | Backer et al. | |
| 2009/0116489 A1 * | 5/2009 | Hanks | H04L 47/10 |
| | | | 370/394 |
| 2011/0252152 A1 * | 10/2011 | Sherry | H04L 67/02 |
| | | | 709/228 |
| 2014/0036936 A1 | 2/2014 | Bui et al. | |
| 2015/0066881 A1 | 3/2015 | Sundaram et al. | |
| 2016/0105814 A1 | 4/2016 | Hurst et al. | |
| 2016/0156502 A1 | 6/2016 | Fugitt et al. | |
| 2020/0257693 A1 | 8/2020 | Pounds et al. | |
| 2021/0306293 A1 | 9/2021 | Baron et al. | |

OTHER PUBLICATIONS

U.S. Appl. No. 17/249,899 U.S. Pat. No. 11,563,709, filed Mar. 17, 2021, Messaging System of Partial and Out-Of-Order Events.

* cited by examiner

MESSAGING SYSTEM OF PARTIAL AND OUT-OF-ORDER EVENTS

CLAIM OF PRIORITY

This application is a continuation of U.S. patent application Ser. No. 17/249,899, filed Mar. 17, 2021, which claims the benefit of priority to U.S. Provisional Application Ser. No. 63/003,127, filed on Mar. 31, 2020, which are incorporated herein by reference in their entireties.

TECHNICAL FIELD

The present disclosure generally relates to the technical field of social networks. In particular, the present embodiments are generally directed to managing partial and out-of-order events.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

Central to a social networking platform is the support of messages, including user-generated messages or event messages. Given the tremendous number of event messages being communicated within a social networking platform, oftentimes event messages arrive at the server of the social networking platform in any arbitrary order due to the different routing paths the event messages take before arriving at the server. Therefore, the ordering of the event messages upon arrival usually does not reflect the ordering in which they are intended to be communicated. If the server simply processes and synchronizes the event messages in the order in which they are received, a misrepresentation of messaging content is likely to occur, negatively affecting user experience.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
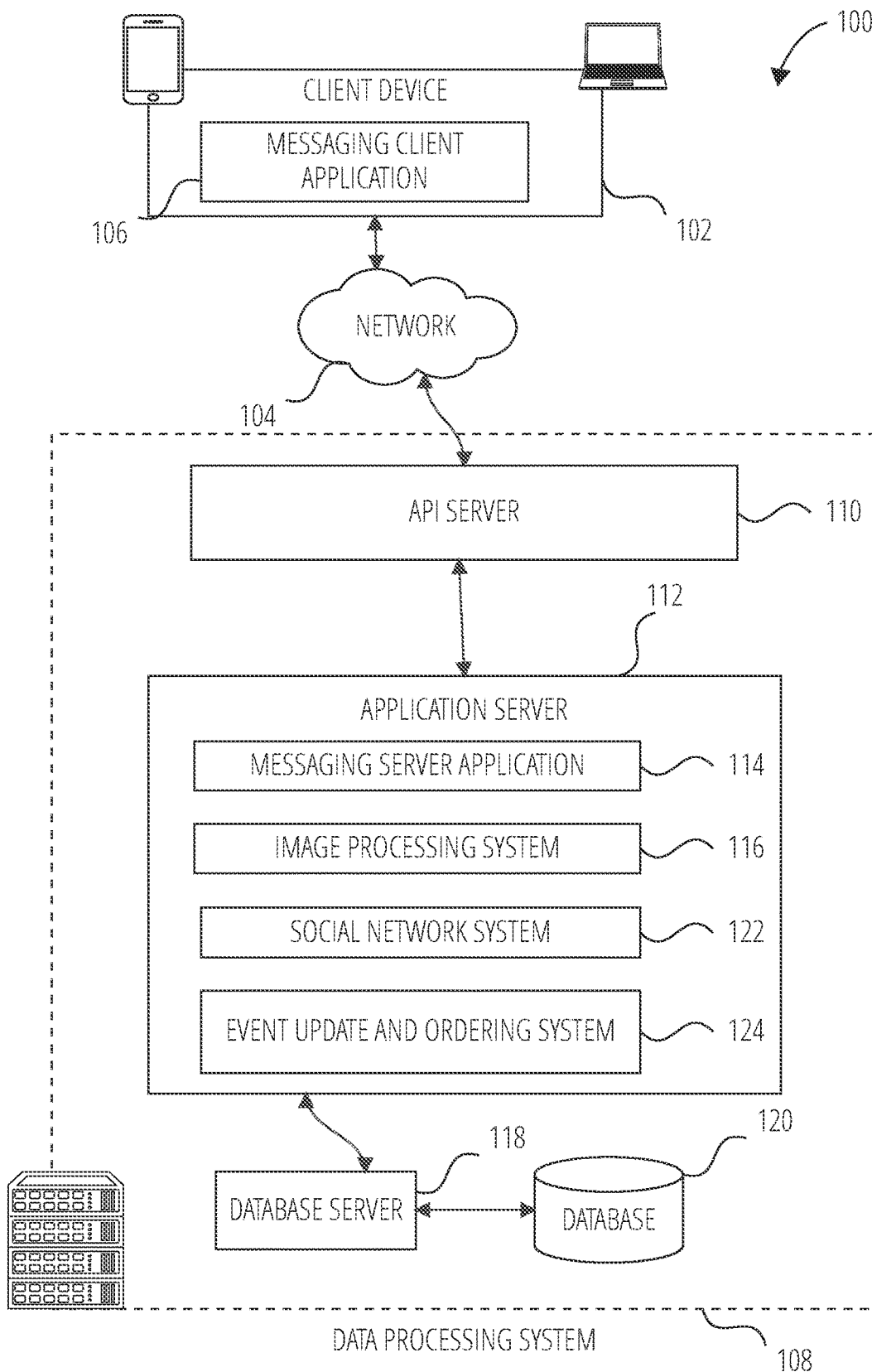
FIG. 1 is a diagrammatic representation of a networked environment in which the present disclosure may be deployed in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Many users consume media content such as videos, pictures, and text messages on their mobile devices (e.g., client devices). Such media content is typically exchanged in chat sessions between users. Users may log off a server that maintains the contents of their respective messaging applications, such as the chat sessions and friend feeds. At a later time, the users via their respective client devices may log back on and send queries to the server for receiving the most recent messaging application content, such as most recent chat messages and friend feeds. Oftentimes event messages arrive at the server in any arbitrary order due to the different routing paths the messages take before arriving at the server. The ordering of the event messages upon arrival usually does not reflect the ordering in which they are intended to be communicated. For example, some event messages were sent out earlier by users but arrived later at the server than some messages that were sent out later by users but arrived earlier at the server. If the server synchronizes the event messages in the order received, a misrepresentation of message content is likely to occur, negatively affecting user experience.

The disclosed examples improve the accuracy of partial and whole event message update and ordering. Incoming event messages are received at an Application Programming Interface (API), and ordered and enqueued by an event queuing system according to a plurality of priority rules based on the order intended to be communicated that accurately reflects user behavior. For example, the event queuing system identifies an out-of-order event based on the content of the event message, the type of the event message, the sequence number or the timestamp associated with the event message. The event queuing system assigns a priority level to the out-of-order event message based on a plurality of priority rules. The event queuing system then places the out-of-order event message in a primary queue of event messages based on the assigned priority levels. The ordered and enqueued event messages in the primary queue are ingested by an event message processing server, and stored in relational or NoSQL databases. The server updates the content of all the event messages that were exchanged while the client device was disconnected from the server, such as during the log-off period. When the users log back on via their respective client devices and send queries to the server for receiving the most recent chat messages and friend feeds, the server reads from the ordered and enqueued event messages stored in the relational or NoSQL databases, and sends them to respective client devices for display in response to queries.

Various aspects and examples will now be described. The following description provides specific details for a thorough understanding and enabling description of these examples. Those skilled in the art will understand, however, that the disclosure may be practiced without many of these details. Additionally, some well-known structures or functions may not be shown or described in detail, so as to avoid unnecessarily obscuring the relevant description.

FIG. 1 is a diagrammatic representation of a networked environment in which the present disclosure may be deployed in accordance with some examples. The network environment 100 can include multiple instances of client device 102, each of which hosts a number of applications including a messaging client application 106. Each messaging client application 106 is communicatively coupled to other instances of the messaging client application 106 and a data processing system 108 via a network 104 (e.g., the Internet). The network environment 100 can also include multiple instances of an API (not shown in FIG. 1). The multiple instances of API, including API 204 (FIG. 2), are communicatively coupled to the data processing system 108 via the network 104.

A messaging client application 106 is able to communicate and exchange data with another messaging client application 106 and with the data processing system 108 via the network 104. The data exchanged between messaging client application 106, and between a messaging client application 106 and the data processing system 108, includes functions (e.g., commands to invoke functions) as well as payload data (e.g., text, audio, video or other multimedia data). The payload data may also include one or more of voice information, MMS or SMS text messages, voicemail information, system messages, email messages, instant messages, pictorial information with or without audio information, video information or audio information, data traffic information, user-opted notifications, information related to a message being saved or unsaved, information related to a message being read, a participating user being added or removed from a conversation, news alerts, social networking chats, social networking posts or social networking status updates, etc.

The data processing system 108 provides server-side functionality via the network 104 to a particular messaging client application 106. While certain functions of the diagrammatic representation of a network environment 100 are described herein as being performed by either a messaging client application 106 or by the data processing system 108, the location of certain functionality either within the messaging client application 106 or the data processing system 108 is a design choice. For example, it may be technically preferable to initially deploy certain technology and functionality within the data processing system 108, but to later migrate this technology and functionality to the messaging client application 106 where a client device 102 has sufficient processing capacity. For example, when a user client device 102 disconnects from the application server 112 by either logging off from the user account or temporarily losing connection with the network 104, the data processing system 108 may retain enqueued unread event messages in the database 120 until the client device 102 logs back on to the user account or regains connection with the network 104. The data processing system 108 will then send the messages to the messaging client application 106 in each client device 102 that are associated with the user being affected by the event messages.

In various examples, the event messages can include one or more of voice information, MMS or SMS text messages, voicemail information, system messages, email messages, instant messages, pictorial information with or without audio information, video information or audio information, data traffic information, user-opted notifications, information related to a message being saved or unsaved, information related to a message being read, a participating user being added or removed from a conversation, news alerts, social networking chats, social networking posts or social networking status updates, etc.

The data processing system 108 supports various services and operations that are provided to the messaging client application 106. Such operations include transmitting data to, receiving data from, and processing data generated by the messaging client application 106. This data may include message content, client device information, geolocation information, media annotation and overlays, message content persistence conditions, social network information, live event information, and advertisements information, as examples. Data exchanges within the networked environment 100 are invoked and controlled through functions available via user interfaces (UIs) of the messaging client application 106.

Turning now specifically to the data processing system 108, an API server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits data such as message data (e.g., commands and message payloads) and advertisement data between the client device 102 and the application server 112. The API server 110 also receives and transmits data such as queries requesting the status of advertisements performed in the client device 102 between API 204 and the application server 112.

Specifically, the API server 110 provides a set of interfaces (e.g., routines and protocols) that can be called or queried by the messaging client application 106 and API 204 in order to invoke the functionality of the application server 112. The API server 110 exposes various functions supported by the application server 112, including account registration, login functionality, the sending of messages, via the application server 112, from a particular messaging client application 106 to another messaging client application 106, the sending of media files (e.g., images or video) from a messaging client application 106 to the messaging server application 114, and for possible access by another messaging client application 106, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 106).

The API server 110 also exposes functions supported by the application server 112, including account registration, login functionality, the sending and receiving of messages or queries, via the application server 112, to the event message update and ordering system 124, and for possible access by the API 204.

The application server 112 hosts a number of applications and subsystems, including a messaging server application 114, an image processing system 116, a social network system 122, and an event message update and ordering system 124. The messaging server application 114 implements a number of message processing technologies and functions, particularly related to the aggregation and other processing of content (e.g., textual and multimedia content) included in messages received from multiple instances of the messaging client application 106. As will be described in further detail, the text and media content from multiple sources may be aggregated into collections of content (e.g., called Stories or Galleries). These collections are then made available, by the messaging server application 114, to the messaging client application 106. Other processor and memory intensive processing of data may also be performed server-side by the messaging server application 114, in view of the hardware requirements for such processing.

The application server 112 also includes an image processing system 116 that is dedicated to performing various image processing operations, with respect to images or video received within the payload of a message at the messaging server application 114.

Figure 7:
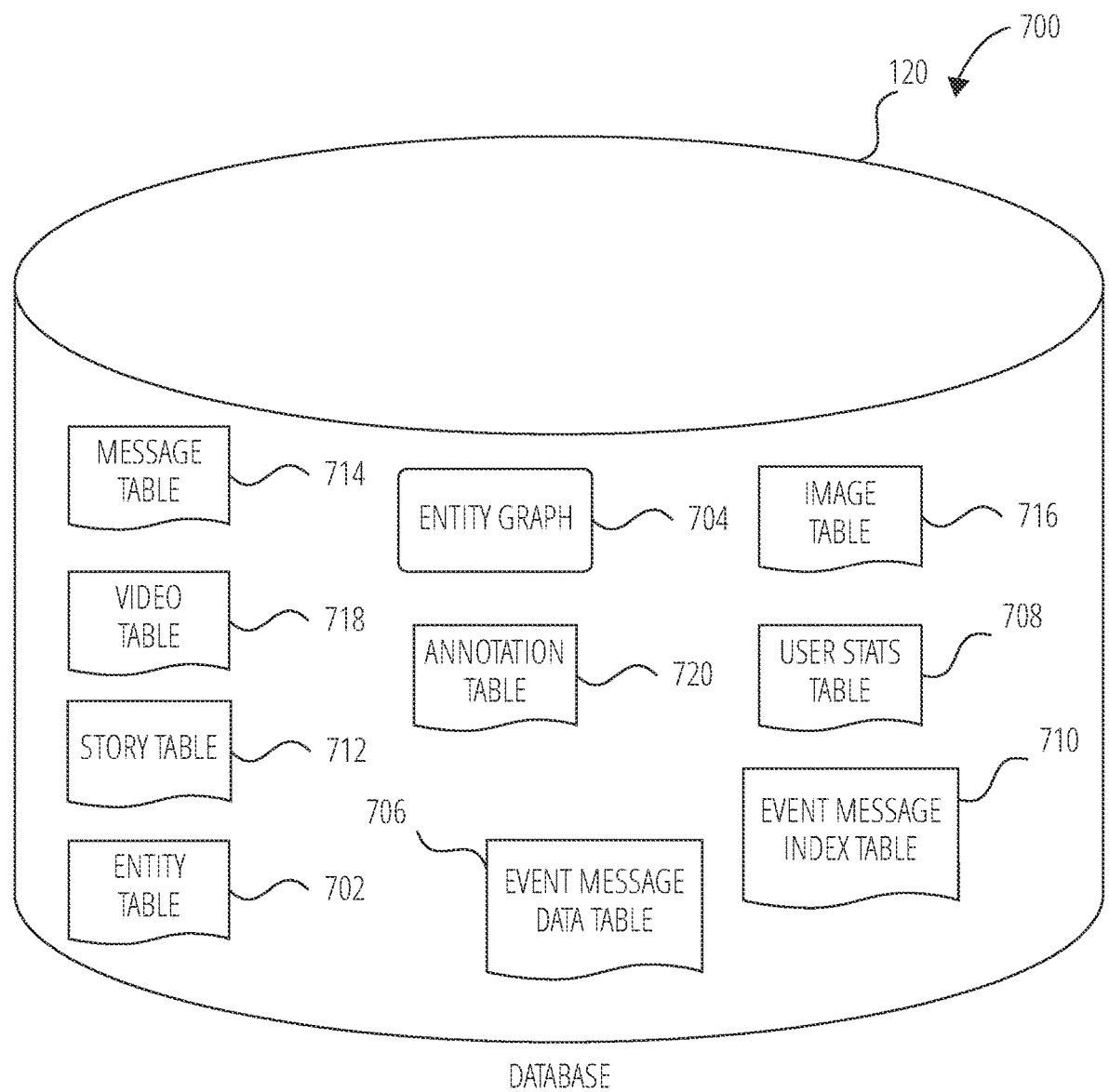
FIG. 7 is a diagrammatic representation of a data structure as maintained in a database, in accordance with some examples.

The social network system 122 supports various social networking functions services, and makes these functions and services available to the messaging server application 114. To this end, the social network system 122 maintains and accesses an entity graph 704 (as shown in FIG. 7) within the database 120. Examples of functions and services supported by the social network system 122 include the identification of other users of the networked environment 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114 and log events processed by event message update and ordering system 124.

Event messages that arrive at the application server 112 in an order misrepresenting the user's behavior are referred to as out-of-order event messages. The event message update and ordering system 124 supports functions such as periodically receiving event messages generated by various client devices 102, identifying out-of-order event messages, enqueuing received event messages including out-of-order event messages in the order according to a set of plurality rules, writing the ordered event messages in the database 120 via the database server 118, and delivering the ordered event messages to each client device 102 associated with each user being affected.

Figure 2:
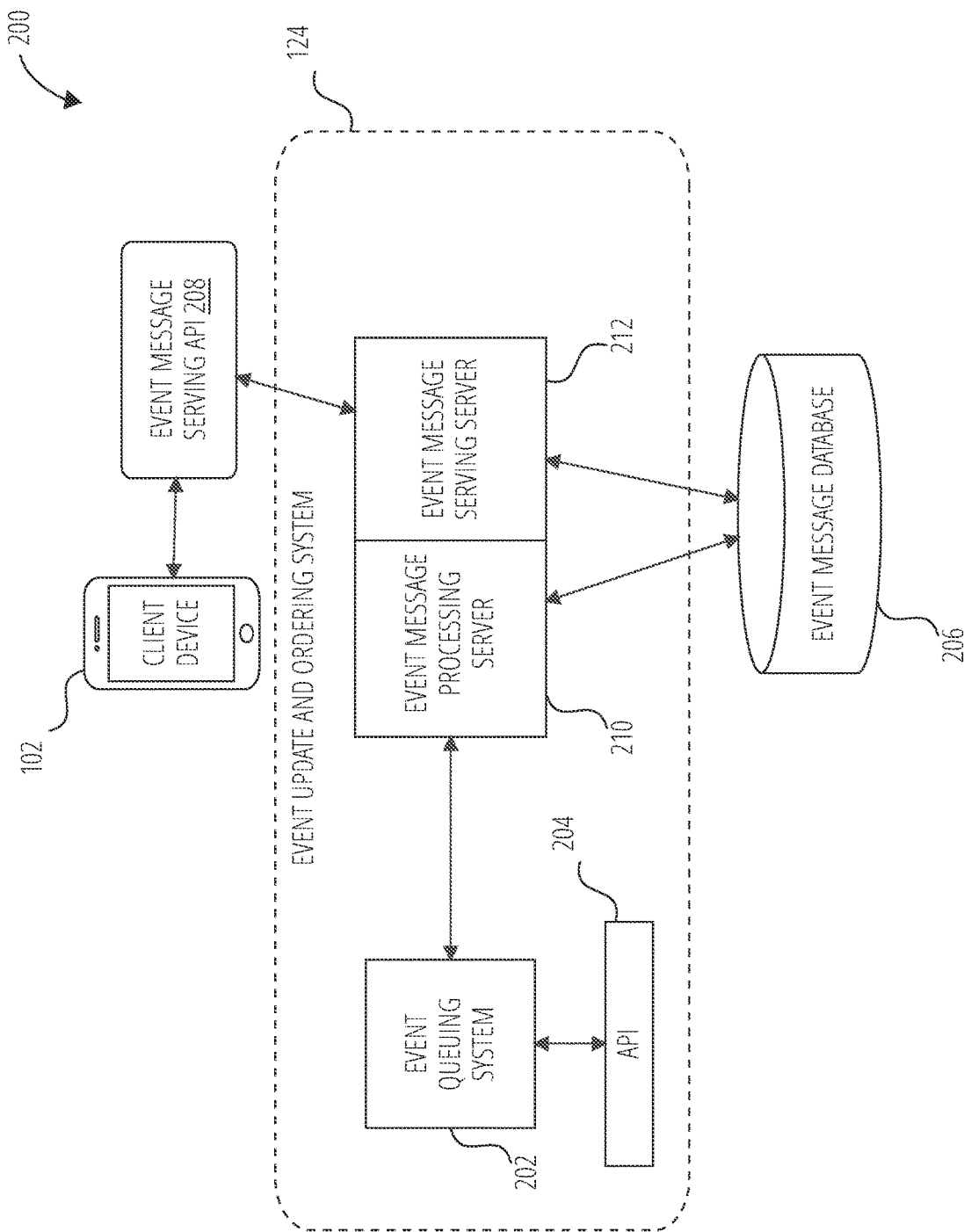
FIG. 2 is a diagrammatic representation of further details of the data processing system of a network environment in accordance with some examples.

FIG. 2 is a diagrammatic representation of further details of the data processing system of a network environment in accordance with some examples. As shown in FIG. 2, the data processing system 108 can communicate with at least one client device 102 and at least one API 204. The API 204 communicates with the Application Program Interface (API) server 110 that exposes functions supported by the application server 112.

Figure 3:
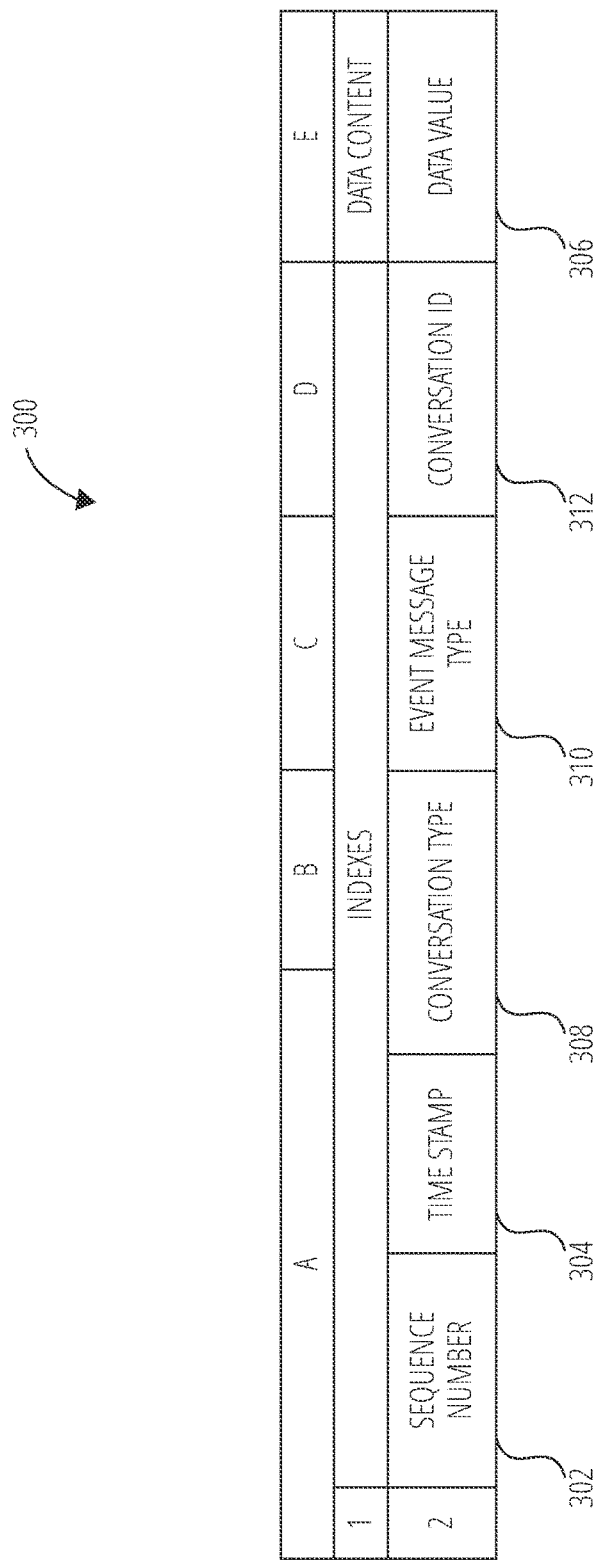
FIG. 3 is a diagrammatic representation of an event message in accordance with some examples.

The event message update and ordering system 124 includes an event queuing system 202, the API 204, an event message processing server 210, an event message serving server 212. Users send out event messages via respective client devices 102 to API 204, which receives the event messages and assigns indexes to each message received. FIG. 3 shows an illustrative payload of an event message according to some examples. A payload of an event message comprises a plurality of indexes and data value. The plurality of indexes may include the event message comprising a sequence number 302 and associated data, as shown in FIG. 3, including timestamp 304, conversation type 308, event message type 310, conversation ID 312. The API 204 sends received event messages to the event queuing system 202 for processing.

The event queuing system 202 builds real-time streaming data pipelines that reliably process data between systems and applications. A stream of event messages (e.g., a plurality of event messages) may arrive at the application server 112 at any time, in any arbitrary order. If the event queuing system 202 was to place the event messages in a primary queue in the order they are received, and send them to each client device 102 associated with each user being affected, the event messages may misrepresent the content of the messages, causing confusion and negative user experience.

Instead, the event queuing system 202 assigns a priority level to each received event message according to a plurality of priority rules, and places the event messages in a primary queue (e.g., the stream) in the order of the priority levels assigned.

In some examples, the plurality of priority rules includes assigning priority levels based on the timestamp of the event message indicating the time being sent from each associated client device 102. For example, an event message sent by a client device 102 earlier in time is assigned a higher priority level over an event message later sent by the client device or another client device. The event queuing system 202 then reorders the event messages in a primary queue based on the assigned priority levels reflecting the chronological order in which they were sent from each associated client device.

In some examples, the plurality of priority rules includes assigning priority levels based on the type of event messages according to a predetermined priority hierarchy. For example, a pictorial event message with audio information takes priority over a pictorial event message without audio information. A pictorial event message without audio information takes priority over a status event message, such as a participant (e.g., a friend) joining or leaving a group conversation, adding or removing a friend, or changing a unilateral friendship to a bilateral friendship, etc. A status event message takes priority over an unread text event message which takes priority over a read text event message. Under this priority rule, for example in a group conversation, a pictorial event message with audio information being sent later may be displayed in a user interface (e.g., a write window) prior to a text event message being sent earlier.

In some examples, the plurality of priority rules includes assigning priority levels based on the sequence number assigned to each event message. For example, referring to FIG. 3, a sequence number 302 represents the order in which a user creates an event message. The sequence number is assigned by the client device 102, from which the event message is being sent. For example, in a one-on-one conversation involving participants A and B. The user A sends a first message with an indexed sequence number A1. The user B sends a first message in response to the message A1 with an indexed sequence number B1. The user A sends another message in response to message B1 with an indexed sequence number A2. In some examples, a priority rule may provide sorting a stream of event messages solely based on the numerical order of the sequence numbers, e.g., A1, B1, A2, B2, etc. For example, A1 is assigned a higher priority level over B1, which is assigned a higher priority level over A2, which is assigned a higher priority level over B2, etc.

In some examples, based on if missing data referred by an identified out-of-order event message can be pre-fetched from database 120. If the missing data can be pre-fetched, the out-of-order event is assigned a lower priority level compared to the pre-fetched missing data, and is placed in the primary queue. If the missing data cannot be pre-fetched, the out-of-order event is assigned a lower priority level and placed back in the primary queue for processing at a later time, in order to wait for the missing data to arrive.

The event queuing system 202 may reside in the API 204 according to some examples. The event queuing system 202 may alternatively reside in the event message processing server 210 according to some other examples.

The event message processing server 210 processes the ordered stream of event messages and writes them into the event message database 206. The event message database 206 may reside in the database 120. The event message database 206 includes a table for each user per each conversation in which they participate. The event message database 206 may be a relational database, or a distributed NoSQL database.

Once the user logs back onto the user account via messaging client application 106, a query is sent by client device 102 requesting the most recent feed update. The feed update includes each relevant event message received since the user logged off from the user account or the client device 102 being disconnected from the network 104. The event message serving server 212 fetches the relevant event messages and passes to the event message serving API 208. The event message serving API 208 delivers the relevant event messages on the user interface.

In some examples, the event message update and ordering system 124 receives via a user interface of a client device, a query of the most recent event messages related to the user. The event message update and ordering system 124 retrieves the event messages relevant to the user via the event message serving server 212 from the event message database 206, and sends the event messages back to the client device. The event messages may be displayed on the user interface of the client device in the order of the assigned priority levels associated with each message. In some examples, when the quantity of the stream of event messages exceeds a threshold of the number of event messages to be displayed on a user interface in one-page size, event message update and ordering system 124 may reduce the amount of event messages to fit in the user interface without user interactions for viewing.

The event message processing server 210 and the event message serving server 212 may reside in the application server 112. A synchronization between the event message database 206 and the database (not shown) within a client device 102 may occur in real-time, to ensure that users may access the most recent feed update in any given time, and the feed update appears in the correct order according to the plurality of priority rules governing each event message.

FIG. 3 is a diagrammatic representation of an event message in accordance with some examples. A payload of event message 300 comprises a plurality of indexes and data value. The plurality of indexes may include timestamp 304, conversation type 308, event message type 310, conversation ID 312.

The sequence number 302 represents the order in which a user creates an event message. For example, in a one-on-one conversation involving participants A and B. The user A sends a first message, indexed as sequence number A1. The user B sends a first message in response to the message A1, indexed as B1. The user A sends another message in response to message B1, indexed as A2. In some examples, a priority rule may provide sorting a stream of event messages solely based on the numerical order of the sequence numbers, e.g., A1, B1, A2, B2, etc.

The timestamp 304 represents either the time of the event message being sent from a client device 102, or the time of the event message being received by the application server 112, or both. The conversation type 308 identifies either the conversation as a one-on-one conversation, or as a group conversation. The event message type identifies the type of the message, including one or more of voice information, MMS or SMS text messages, voicemail information, system messages, email messages, instant messages, pictorial information with or without audio information, video information or audio information, data traffic information, user-opted notifications, information related to a message being saved or unsaved, information related to a message being read, a participating user being added or removed from a conversation, news alerts, social networking chats, social networking posts or social networking status updates, etc.

The conversation ID 312 represents the identification of the conversation that points to the participating users. The event message update and ordering system 124 provides a personalized feed update, meaning that it only updates a user with event messages that affect them. For example, in a group conversation, only the event message creator receives information indicating if the event message has been viewed by other participating users.

Figure 4:
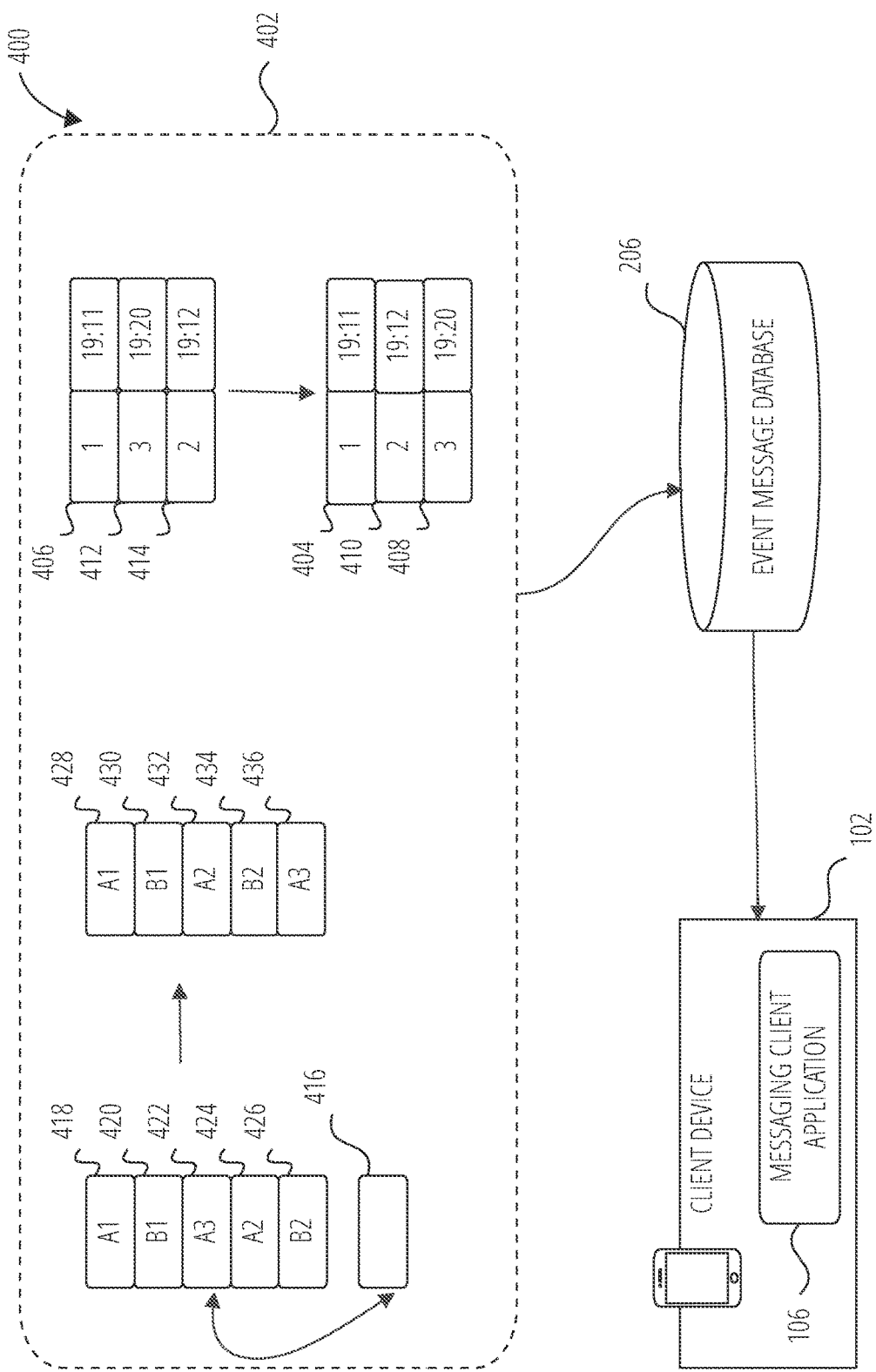
FIG. 4 is a block diagram of event message ordering in a conversation in accordance with some examples.

FIG. 4 is a block diagram of event message ordering in a conversation in accordance with some examples. For example, in a one-on-one conversation involving user A and user B, event messages A1 418, A2 424 and A3 422 are sent from user A. Event messages B1 420 and B2 426 are sent from user B. According to one of the plurality of priority rules, the event queuing system 202 identifies an out-of-order event message if the associated sequence number is out of chronological order. For example, a chronological order of the sequence number in a conversation between user A and user B may be strictly increasing, such as A1, B1, A2, B2, A3, B3, etc. As shown in FIG. 4, the original ordering of the stream has A3 422 coming before A2 424 and B2 426. Therefore, the event queuing system 202 identifies A3 422 as an out-of-order event message. Once an out-of-order event message is identified, the event queuing system 202 places A3 422 at the end of the queue following B2 434, in compliance with the chronological order of strictly increasing sequence numbers. The queue comprising A1 428, B1 430, A2 432, B2 434, and A3 436 is a primary queue maintained by the event queuing system 202. The sequence number of each associated event message may be identified by the index value of the sequence number 302 as shown in the payload of an event message 300 in FIG. 3.

In some examples, an out-of-order event message is identified based on the timestamp indicating when the event message was sent from a client device. As shown in FIG. 4, the event messages 1, 2, and 3 were originally received at the server in the order shown as data items 406, 412 and 414.

The event message 3 (data item 412) was sent by a client device at 19:20, but was received at the server before the event message 2 (data item 414) which was sent out at an earlier time (i.e., 19:12). The event queuing system 202 identifies the message 3 as an out-of-order event message and places it after the event message 2 (data item 414) in the primary queue based on the chronological order of the time indicated by the timestamps associated with the respective event messages. As a result, the ordered primary queue comprises event messages 1, 2, and 3 in the order shown as data items 404, 410, and 408 in compliance with the chronological order of time indicated by the respective timestamp of each event message being sent from each client device. In some examples, after the event queuing system 202 identifies the event message 3 as an out-of-order event message, the event queuing system 202 assigns a lower priority level to the out-of-order event message (e.g., the event message 3) compared to the priority level assigned to the event message that was received thereafter (e.g., the event message 2), thereby the event messages are reordered based on the priority levels assigned, such as in the order shown as data items 404, 410, and 408 in compliance with the chronological order of time.

The primary queue may be maintained by the event queuing system 202. The timestamp of each associated event message may be identified by the index value of each associated timestamp 304 as shown in the payload of an event message 300 in FIG. 3.

A person of ordinary skill in the art should appreciate that the abovementioned ordering mechanisms and priority rules similarly apply to a group conversation involving three or more participating users.

The stream of events ordering process takes place within the event queuing system 202, and the data structure as shown in block diagram 402 resides in an in-memory database of the event queuing system 202, or alternatively, resides in a relational or NoSQL database (not shown) included in the event queuing system 202. The event queuing system 202 subsequently writes the ordered stream of event messages into the event message database 206, and send it to each affected client device in response to queries.

Figure 5:
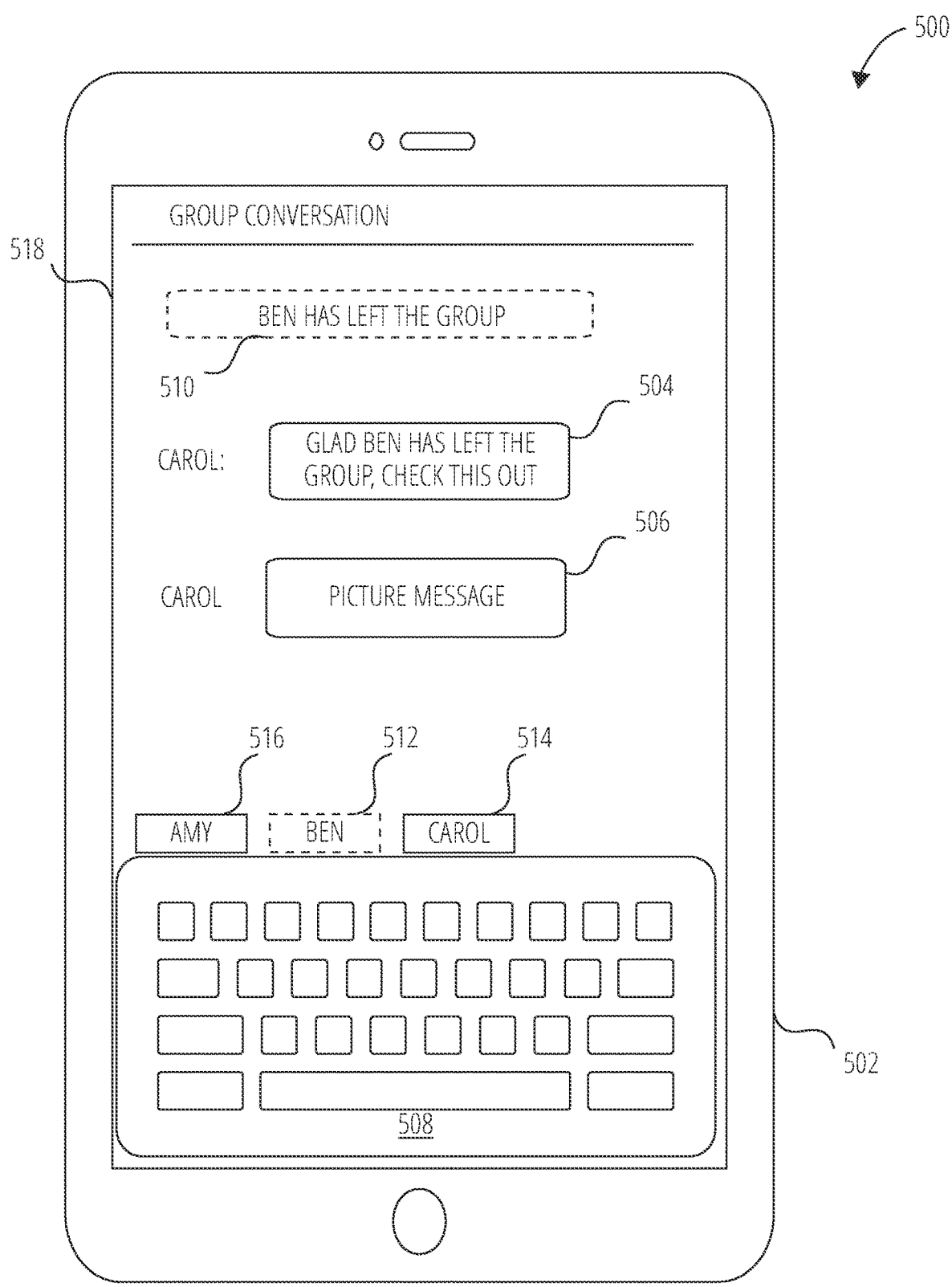
FIG. 5 is a user interface diagram showing a stream of event messages in a group conversation in accordance with some examples.
Figure 6:
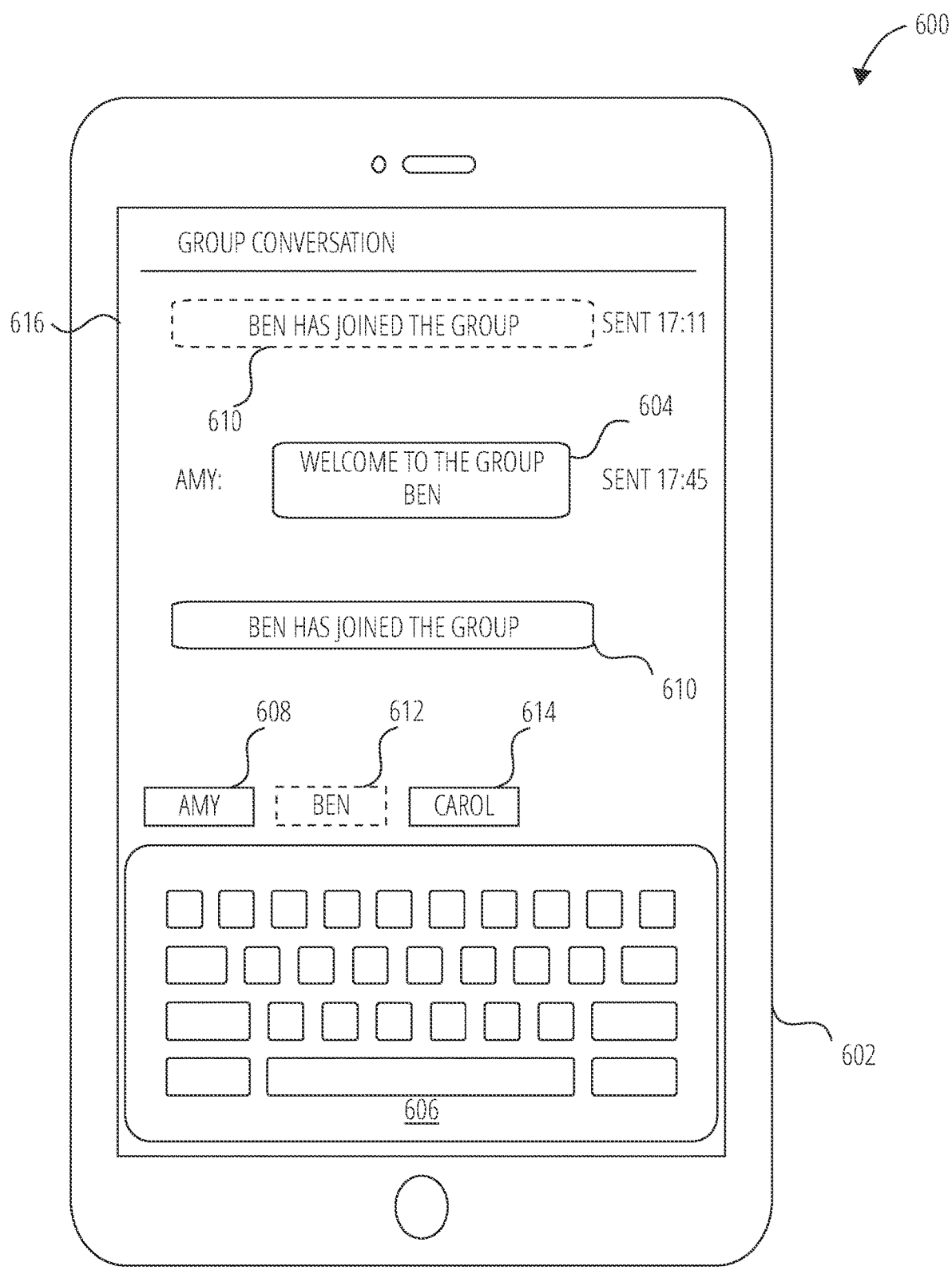
FIG. 6 is a user interface diagram showing a stream of event messages in a group conversation in accordance with some examples.

FIG. 5 is a user interface diagram showing a stream of event messages in a group conversation in accordance with some examples. In some examples, an event message may intuit an incoming missing data in the form of an event message, in which case the event message is identified as an out-of-order event message. As shown in FIG. 5, a user interface 518 on a client device 502 provides a threaded messaging screen that facilitates event messages display. The threaded messages may be a one-on-one conversation involving two participating users (not shown), or a group conversation involving three or more participating users such as illustrated in FIG. 5 and FIG. 6. The threaded messages in a conversation may include any type of abovementioned event messages, including but not limited to one or more telephone calls (voice calls or video calls), multimedia messages, text messages, system notifications related to the conversation, etc. The client device 502 may be one of the plurality of client devices 102.

Each event message 504, 506 and 510 occupies a feed cell, which shows the content of each event message, e.g., the data value 306 in FIG. 3. Both event messages 504 and 506 are text messages. The event message 510 is a system notification. The conversation as shown in FIG. 5 is a group conversation involving three participants, e.g., Amy 516, Ben 512 and Carol 514. The dotted line around the feed cell 510 indicates a missing event message should have appeared had it arrived in the order intended to be communicated. The event queuing system 202 has not yet received the system notification 510 at the time it received event message 504.

The content of the event message 504 includes an entity identifier (not shown in FIG. 3) pointing to participant Ben 512 and a data content 306 indicating Ben has left the group. Since the event queuing system 202 has not yet received the event message 510 which is a system notification indicating Ben 512 has left the group, the event queuing system 202 identifies system notification 510 as missing data and identifies event message 504 as an out-of-order event message.

In some other examples, since Ben 512 as one of the participants is known to the system, the event queuing system 202 may pre-fetch the information associated with Ben 512 from the event message database 206, and generate a system notification 510 to be placed before the out-of-order event message 504 in the primary queue by assigning the out-of-order event message 504 a lower priority level than the generated system notification 510. It makes the conversation state (e.g., threaded messages) appear correct without having to place the out-of-order event message 504 back to the primary queue and wait for the system notification 510 to arrive.

When the event queuing system 202 later receives the system notification 510 indicating that Ben has left the group, the event queuing system 202 may treat it as redundant data and delete it according to some examples.

FIG. 6 is a user interface diagram showing a stream of event messages in a group conversation in accordance with some examples. In some examples, when the missing data or the missing event message is not known to the data processing system 108, the event queuing system 202 may assign the out-of-order event message with a lower priority level and place it in the primary queue in order to wait for the missing data to arrive. According to some examples, the event queuing system 202 places the out-of-order event message in a secondary queue (not shown) based on having been placed in the primary queue a threshold number of times. A secondary queue is assigned a lower priority ranking in processing compared to the primary queue in the event queuing system 202, that the event message processing server 210 prioritizes the processing of primary queue than the processing of the secondary queue. For example, the event message processing server 210 may process the primary queue twice before starting to process the secondary queue. In some other examples, the event message processing server 210 may cease processing the secondary queue when there are new event messages enqueued in the primary queue.

As shown in FIG. 6, a user interface 616 on a client device 602 provides a threaded messaging screen that facilitates event messages display. The client device 602 may be one of the plurality of client device 102. The threaded messages as shown in FIG. 6 are in a group conversation involving three participating users, e.g., Amy 608, Ben 612 and Carol 614. The threaded messages in a conversation may include any type of abovementioned event messages, including but not limited to one or more telephone calls (voice calls or video calls), multimedia messages, text messages, system notifications related to the conversation, etc.

The content of the event message 604 includes an entity identifier (not shown in FIG. 3) pointing to participant Ben 612 and a data content 306 indicating Ben has joined the group. Since the event queuing system 202 has not yet received the event message 610 which is a system notification indicating Ben 612 has joined the group, the event queuing system 202 identifies system notification 610 as missing data and identifies the event message 604 as an out-of-order event message.

In some examples, Ben 612 has not established a bilateral or unilateral friendship with any of the group conversation participants, such as Amy 608, Ben 612 and Carol 614, that the system has no data associated with the entity identifier pointing to Ben 612 in the event message database 206. The event queuing system 202 assigns a lower priority level to the out-of-order event message 604 and places it back into the primary queue for processing at a later time. After a predetermined iteration of placing the out-of-order event message 604 back into the primary queue, and if the missing event message 610 still has not arrived, the event queuing system 202 places the out-of-order event 604 in a secondary queue with a lower priority ranking for processing.

In some examples, for example, if Ben 612 has established either a bilateral or unilateral friendship with any of the group conversation participants. The event queuing system 202 may pre-fetch information associated with Ben 612 from the event message database 206, associate participant Ben 612 with the conversation ID of the group conversation, and generate a system notification 610 to be placed before the out-of-order event message 604 in the primary queue by assigning the out-of-order event message 604 a lower priority level than the generated system notification 610. This way it makes the conversation state (e.g., threaded messages) appear correct without having to place the out-of-order event message 604 back to the primary queue and wait for the system notification 610 to arrive.

Once the event queuing system 202 receives the system notification 610 indicating Ben has joined the group, the event queuing system 202 may treat it as redundant data and delete it according to some examples. Alternatively, the event queuing system 202 may place the system notification 610 after the out-of-order event 604 in the primary queue by assigning 604 a higher priority level than the generated system notification 610, even though, at the time the event message 604 was displayed, Ben 612 has already been added to the group conversation.

FIG. 7 is a diagrammatic representation of a data structure as maintained in a database, in accordance with some examples. While the content of the database 120 is shown to comprise a number of tables, it will be appreciated that the data could be stored in other types of data structures (e.g., as an object-oriented database).

The database 120 includes message data stored within a message table 714. The entity table 702 stores entity data, including an entity graph 704. Entities for which records are maintained within the entity table 702 may include individuals, corporate entities, organizations, objects, places, events, etc. Regardless of type, any entity regarding which the data processing system 108 stores data may be a recognized entity. Each entity is provided with a unique identifier, as well as an entity type identifier (not shown).

The entity graph 704 furthermore stores information regarding relationships and associations between entities. Such relationships may be social, professional (e.g., work at a common corporation or organization) interest-based or activity-based, or unilateral or bilateral friendship relationships, merely for example.

The database 120 also stores annotation data, in the example form of filters, in an annotation table 720. Filters for which data is stored within the annotation table 720 are associated with and applied to videos (for which data is stored in a video table 718) and images (for which data is stored in an image table 716). Filters, in one example, are overlays that are displayed as overlaid on an image or video during a presentation to a recipient user. Filters may be of varies types, including user-selected filters from a gallery of filters presented to a sending user by the messaging client application 106 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 106, based on geolocation information determined by a GPS unit of the client device 102. Another type of filer is a data filer, which may be selectively presented to a sending user by the messaging client application 106, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 716 are augmented reality content items (e.g., corresponding to applying "LENSES" or augmented reality experiences). An augmented reality content item may be a real-time special effect and sound that may be added to an image or a video. Augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified.

As mentioned above, the video table 718 stores video data which, in some examples, is associated with messages for which records are maintained within the message table 714. Similarly, the image table 716 stores image data associated with messages for which message data is stored in the entity table 702. The entity table 702 may associate various annotations from the annotation table 720 with various images and videos stored in the image table 716 and the video table 718.

A story table 712 stores data regarding collections of messages and associated image, video, or audio data, which are compiled into a collection (e.g., a Story or a Gallery). The creation of a particular collection may be initiated by a particular user (e.g., each user for which a record is maintained in the entity table 702). A user may create a "personal story" in the form of a collection of content that has been created and sent/broadcast by that user. To this end, the user interface of the messaging client application 106 may include an icon that is user-selectable to let a sending user add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services turned on and are at a common location event at a particular time may, for example, be presented with an option, via a user interface of the messaging client application 106, to contribute content to a particular live story. The live story may be identified to the user by the messaging client application 106, based on his or her location. The end result is a "live story" told from a community perspective.

A further type of content collection is known as a "location story", which provides a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

An event message data table 706 stores the content of ordered event messages (e.g., the data value 306 of each event message) after being processed by the event queuing system 202. The event message data table 706 may reside in the event message database 206, and may include a table per each user and per each conversation the user participates therein.

An event message index table 710 stores index information associated with each ordered event message, including sequence number 302, timestamp 304, conversation type 308, event message type 310, and conversation ID 312 as shown in FIG. 3. The event message index table 710 may reside in event message database 206, and may include a table per each user and per each conversation the user participates therein.

A user stats table 708 stores data associated with each user, including user bibliographical information, home region information, location information, etc. The user stats table 708 may reside in event message database 206, and may include a table per each user. The user stats table 708 may reside in the entity table 702.

Figure 8:
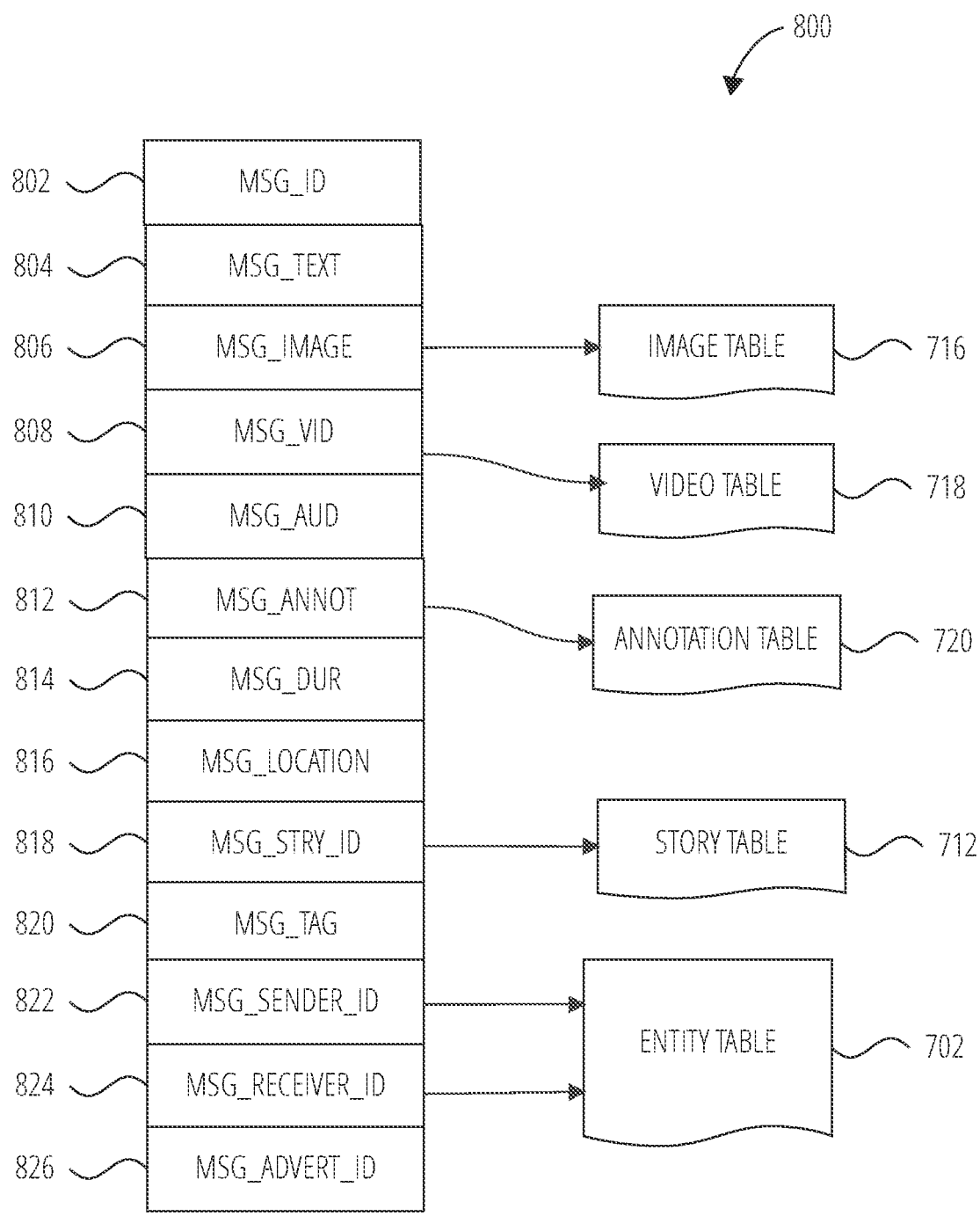
FIG. 8 is a diagrammatic representation of an event message, in accordance with some examples.

FIG. 8 is a diagrammatic representation of an event message, in accordance with some example examples, generated by a messaging client application 106 for communication to a further messaging client application 106 or the messaging server application 114. The content of a particular message 800 is used to populate the message table 714 stored within the database 120, accessible by the messaging server application 114. Similarly, the content of a message 800 is stored in memory as "in-transit" or "in-flight" data of the client device 102 or the application server 112. The message 800 is shown to include the following components:

- A message identifier 802: a unique identifier that identifies the message 800.
- A message text payload 804: text, to be generated by a user via a user interface of the client device 102 and that is included in the message 800.
- A message image payload 806: image data, captured by a camera component of a client device 102 or retrieved from a memory component of a client device 102, and that is included in the message 800.
- A message video payload 808: video data, captured by a camera component or retrieved from a memory component of the client device 102 and that is included in the message 800.
- A message audio payload 810: audio data, captured by a microphone or retrieved from a memory component of the client device 102, and that is included in the message 800.
- A message annotations 812: annotation data (e.g., filters, stickers or other enhancements) that represent annotations to be applied to message image payload 806, message video payload 808, or message audio payload 810 of the message 800.
- A message duration parameter 814: parameter value indicating, in seconds, the amount of time for which content of the message (e.g., the message image payload 806, message video payload 808, message audio payload 810) is to be presented or made accessible to a user via the messaging client application 106.
- A message geolocation parameter 816: geolocation data (e.g., latitudinal and longitudinal coordinates) associated with the content payload of the message. Multiple message geolocation parameter 816 values may be included in the payload, each of these parameter values being associated with respect to content items included in the content (e.g., a specific image within the message image payload 806, or a specific video in the message video payload 808).
- A message story identifier 818: identifier values identifying one or more content collections (e.g., "Stories") with which a particular content item in the message image payload 806 of the message 800 is associated. For example, multiple images within the message image payload 806 may each be associated with multiple content collections using identifier values.
- A message tag 820: each message 800 may be tagged with multiple tags, each of which is indicative of the subject matter of content included in the message payload. For example, where a particular image included in the message image payload 806 depicts an animal (e.g., a lion), a tag value may be included within the message tag 820 that is indicative of the relevant animal. Tag values may be generated manually, based on user input, or may be automatically generated using, for example, image recognition.
- A message sender identifier 822: an identifier (e.g., a messaging system identifier, email address, or device identifier) indicative of a user of the client device 102 on which the message 800 was generated and from which the message 800 was sent.
- A message receiver identifier 824: an identifier (e.g., a messaging system identifier, email address, or device identifier) indicative of a user of the client device 102 to which the message 800 is addressed.

The contents (e.g., values) of the various components of message 800 may be pointers to locations in tables within which content data values are stored. For example, an image value in the message image payload 806 may be a pointer to (or address of) a location within an image table 716. Similarly, values within the message video payload 808 may point to data stored within a video table 718, values stored within the message annotations 812 may point to data stored in an annotation table 720, values stored within the message story identifier 818 may point to data stored in a story table 712, and values stored within the message sender identifier 822 and the message receiver identifier 824 may point to user records stored within an entity table 702.

Figure 9:
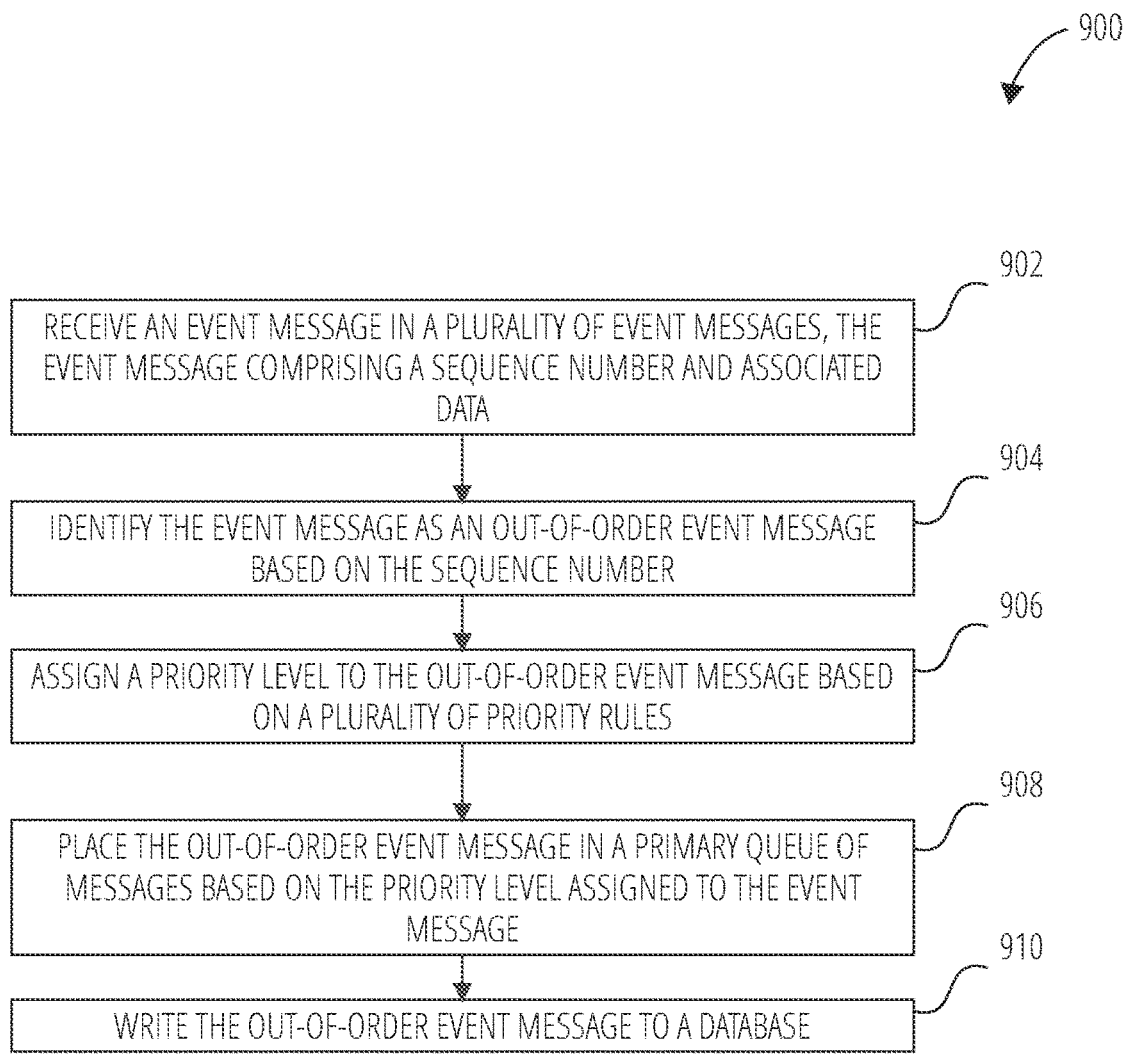
FIGS. 9 and 10 are flow diagrams of processes in accordance with some examples.

FIG. 9 is a flow diagram of processes in accordance with some examples. The event message update and ordering system 124 starts at operation 902, the event message update and ordering system 124 receives an event message from API 204, the event message comprising a sequence number 302 and associated data as shown in FIG. 3, including timestamp 304, conversation type 308, event message type 310, conversation ID 312 and the data value 306 associated with the event message.

At operation 904, the event message update and ordering system 124 identifies an event message as an out-of-order event message based on the sequence number 302. In some examples, the event message update and ordering system 124 identifies an out-of-order event based on the timestamp 304 indicating the time the event message was sent from an associated client device 102.

At operation 906, the event message update and ordering system 124 assigns a priority level to the out-of-order event message based on a plurality of priority rules. In some examples, a pictorial event message with audio information takes priority over a pictorial event message without audio information. A pictorial event message without audio information takes priority over a status event message, such as a participant (e.g., a friend) joining or leaving a group conversation, or adding or removing a friend, changing from a bilateral friendship to a unilateral friendship, etc. A status event message takes priority over an unread text message which takes priority over a read text message. Therefore, under this priority rule, for example in a group conversation, a pictorial event message with audio being sent later may be displayed in a user interface (e.g., a write window) prior to a text message being sent earlier.

In some examples, a priority level is assigned based on the chronological order of the time (e.g., via the timestamp 304) indicating when the event message was sent from a client device 102. In some examples, a priority level is assigned based on the chronological order of strictly increasing sequence number 302 assigned to each user per each event message in a conversation, including one-on-one conversation and group conversation.

In some examples, a priority level is assigned based on whether the missing data or the missing event message can be pre-fetched from the event message database 206. If the missing data or event message can be pre-fetched to make the conversation state appear correct, the out-of-order event message may not be assigned with a lower priority level and be placed back to the primary queue. Instead, the out-of-order event message may be processed right away together with the pre-fetched data from the event message database 206. If the missing data or event message cannot be pre-fetched to make the conversation state appear correct, the out-of-order event message may be assigned a lower priority level and be placed back into the primary queue. In some instances, the out-of-order event message may be placed in a secondary queue with a lower priority ranking for processing.

At operation 908, the event message update and ordering system 124 places the out-of-order event message in a primary queue of messages based on the priority level assigned to the event message. In some examples, a priority level is assigned based on whether the missing data or the missing event message can be pre-fetched from the event message database 206. Similarly as mentioned above, if the missing data or event message is associated with existing data stored in the event message database 206, the out-of-order event message may be assigned a lower priority level and be placed back to the primary queue, in order to wait for the missing data to arrive. In some instances, the out-of-order event message may be placed in a secondary queue with a lower priority ranking of processing after a threshold number of iterations of being placed back in the primary queue.

At operation 910, the event message update and ordering system 124 writes the out-of-order event message to a database, such as the event message database 206, via the event message processing server 210.

Figure 10:
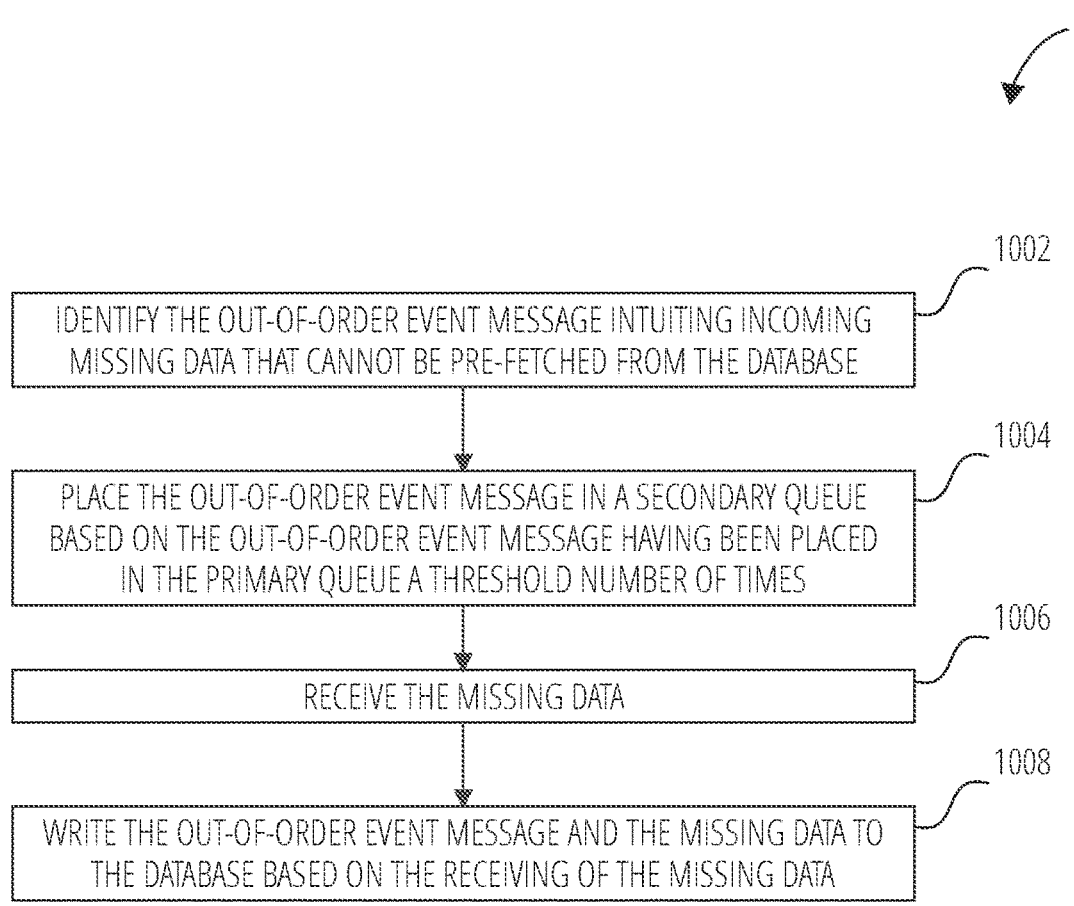

FIG. 10 is a flow diagram of processes in accordance with some examples. At operation 1002, the event message update and ordering system 124 identifies the out-of-order event message as relating to a partial event indicating missing data. For example, the event message update and ordering system 124 identifies missing data intuited by (referred by) the content of the out-of-order event message, such as when the out-of-order event message is addressed to a conversation participant not currently added to the conversation. If the missing data cannot be pre-fetched from the event message database 206, such as the conversation participant has not established a bilateral or unilateral friendship with any of the group conversation participants, the system would have no knowledge as to who the conversation participant is (e.g., no data pointing to the participant in the event message database 206). At operation 1004, the event message update and ordering system 124 places the out-of-order event message in a secondary queue based on the out-of-order event message having been placed in the primary queue a threshold number of times, in order to wait for the missing data associated with the conversation participant to arrive. In some examples, after the event message update and ordering system 124 places the out-of-order event message in the primary queue five times, the event message update and ordering system 124 places the out-of-order event message in the secondary queue for a lower priority ranking of processing.

At operation 1006, the event message update and ordering system 124 receives the missing data intuited by the out-of-order event message. For example, the event message update and ordering system 124 receives information associated with the identity of the conversation participant, and information indicating the conversation participant he has joined the group conversation. At operation 1008, the event message update and ordering system 124 writes the out-of-order event message and the missing data to the database based on the receiving of the missing data. For example, the event message update and ordering system 124 writes the out-of-order event message and the missing data indicating the conversation participant has joined the conversation to the database.

Figure 11:
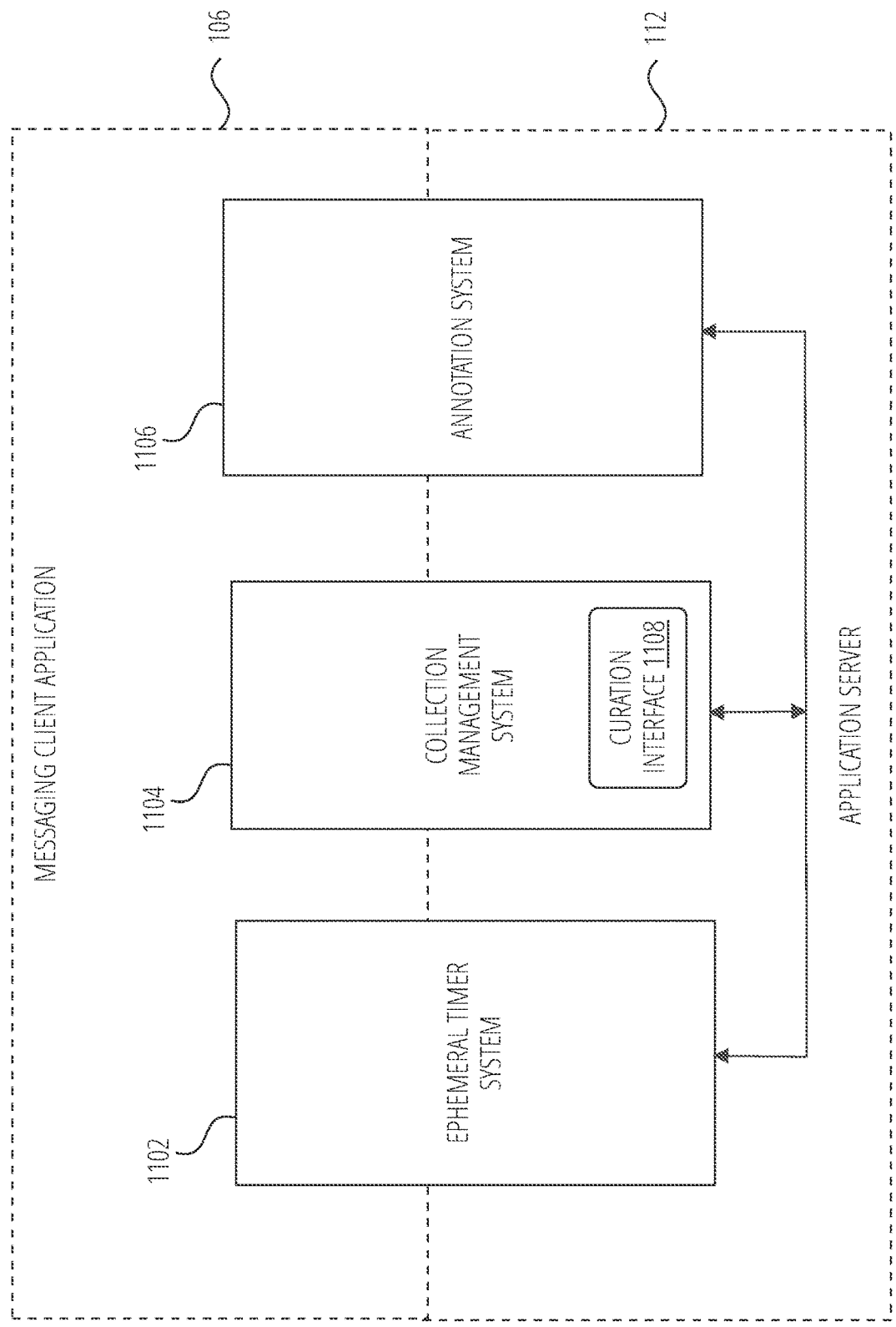
FIG. 11 is a diagrammatic representation of a messaging client application, in accordance with some examples.

FIG. 11 is a diagrammatic representation of a messaging client application, in accordance with some examples. Specifically, the diagrammatic representation of a network environment 100 is shown to comprise the messaging client application 106 and the application server 112, which in turn embodies a number of some subsystems, namely an ephemeral timer system 1102, a collection management system 1104 and an annotation system 1106.

The ephemeral timer system 1102 is responsible for enforcing the temporary access to content permitted by the messaging client application 106 and the messaging server application 114. To this end, the ephemeral timer system 1102 incorporates a number of timers that, based on duration and display parameters associated with a message, or collection of messages (e.g., a story), selectively display and provide access to messages and associated content via the messaging client application 106. Further details regarding the operation of the ephemeral timer system 1102 are provided below.

The collection management system 1104 is responsible for managing collections of media (e.g., collections of text, image video, and audio data). In some examples, a collection of content (e.g., messages, including images, video, text, and audio) may be organized into an "Event Gallery" or an "Event Story." Such a collection may be made available for a specified time period, such as the duration of an event to which the content relates. For example, content relating to a music concert may be made available as a "story" for the duration of that music concert. The collection management system 1104 may also be responsible for publishing an icon that provides notification of the existence of a particular collection to the user interface of the messaging client application 106.

The collection management system 1104 furthermore includes a curation interface 1108 that allows a collection manager to manage and curate a particular collection of content. For example, the curation interface 1108 lets an event organizer curate a collection of content relating to a specific event (e.g., delete inappropriate content or redundant messages). Additionally, the collection management system 1104 employs machine vision (or image recognition technology) and content rules to automatically curate a content collection. In certain examples, compensation may be paid to a user for the inclusion of user-generated content into a collection. In such cases, the curation interface 1108 operates to automatically make payments to such users for the use of their content.

The annotation system 1106 provides various functions that let a user annotate or otherwise modify or edit media content associated with a message. For example, the annotation system 1106 provides functions related to the generation and publishing of media overlays for messages processed by the diagrammatic representation of a network environment 100. The annotation system 1106 operatively supplies a media overlay or supplementation (e.g., an image filter) to the messaging client application 106 based on the geolocation of the client device 102. In another example, the annotation system 1106 operatively supplies a media overlay to the messaging client application 106 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 1106 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the annotation system 1106 provides a user-based publication platform that let users select a geolocation on a map, and upload content associated with the selected geolocation. The user may also specify circumstances under which a particular media overlay should be offered to other users. The annotation system 1106 generates a media overlay that includes the uploaded content and associates the uploaded content with the selected geolocation.

In another example, the annotation system 1106 provides a merchant-based publication platform that provides merchants a particular media overlay associated with a geolocation via a bidding process. For example, the annotation system 1106 associates the media overlay of a highest bidding merchant with a corresponding geolocation for a predefined amount of time.

In some examples, event messages are maintained and managed by the collection management system 1104 as a part of the collections of media, including but not limited to voice information, MMS or SMS text messages, voicemail information, system messages, email messages, instant messages, pictorial information with or without audio information, video information or audio information, data traffic information, user-opted notifications, information related to a message being saved or unsaved, information related to a message being read, a participating user being added or removed from a conversation, news alerts, social networking chats, social networking posts or social networking status updates, etc. Such a collection of event messages may be made available for a specified time period, such as the duration of an event to which the content relates. The ephemeral timer system 1102 is responsible for enforcing the temporary access to the collection of event messages permitted by the messaging client application 106 and the messaging server application 114.

Figure 12:
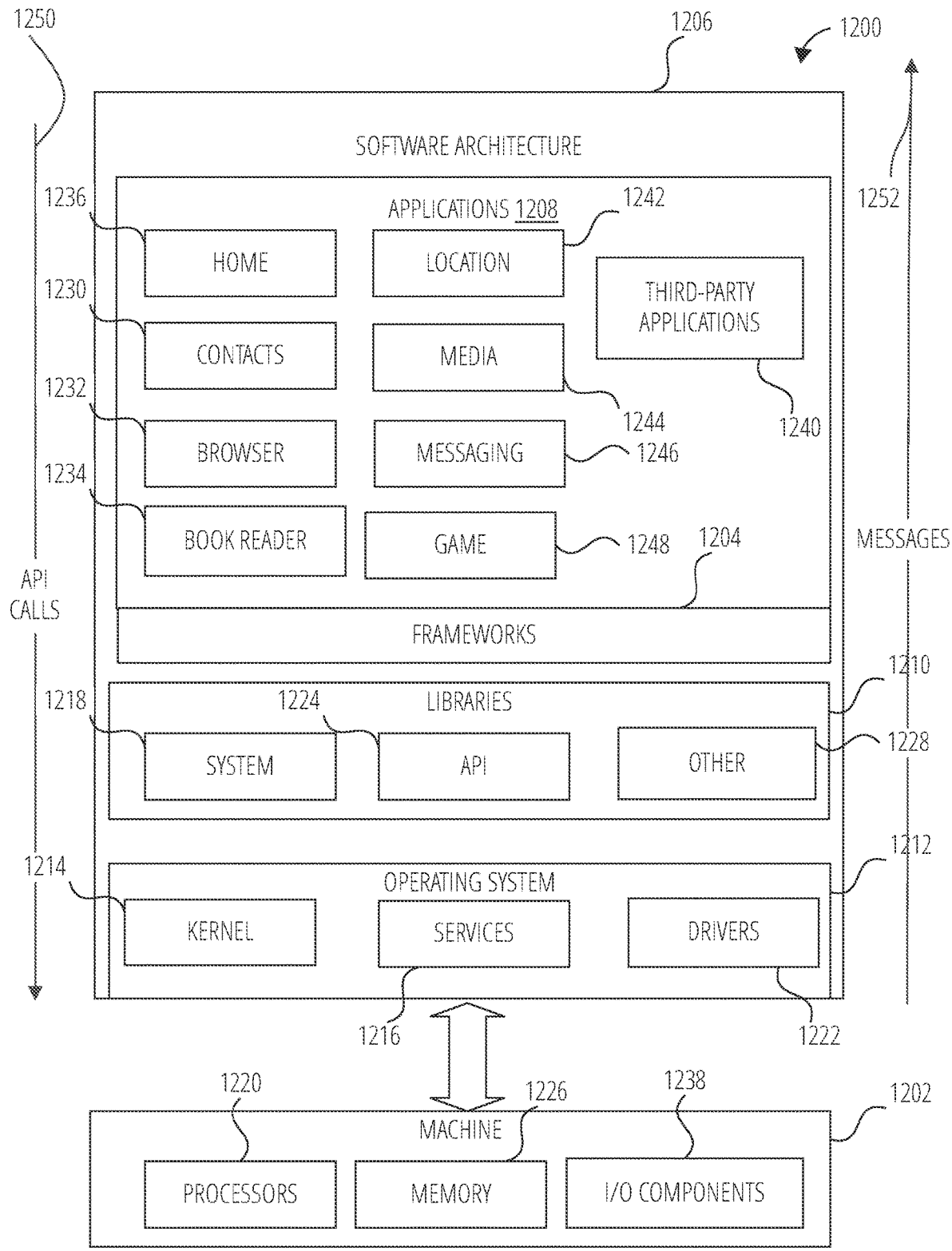
FIG. 12 is a block diagram showing a software architecture within which the present disclosure may be implemented, in accordance with some examples.

FIG. 12 is a block diagram showing a software architecture within which the present disclosure may be implemented, in accordance with some examples. The software architecture 1206 is supported by hardware such as a machine 1202 that includes processors 1220, memory 1226, and I/O components 1238. In this example, the software architecture 1206 can be conceptualized as a stack of layers, where each layer provides a particular functionality. The software architecture 1206 includes layers such as an operating system 1212, libraries 1210, frameworks 1204, and applications 1208. Operationally, the applications 1208 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1208. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1208.

The frameworks 1204 provide a high-level common infrastructure that is used by the applications 1208. For example, the frameworks 1204 provide various graphical user interface (GUI) functions, high-level resource management, and high-level location services. The frameworks 1204 can provide a broad spectrum of other APIs that can be used by the applications 1208, some of which may be specific to a particular operating system or platform.

In some examples, the applications 1208 may include a home application 1236, a contacts application 1230, a browser application 1232, a book reader application 1234, a location application 1242, a media application 1244, a messaging application 1246, a game application 1248, and a broad assortment of other applications, such as third-party applications 1240. The applications 1208 are programs that execute functions defined in the programs. Various programming languages can be employed to create one or more of the applications 1208, structured in a variety of manners, such as object-oriented programming languages (e.g., Objective-C, Java, or C++) or procedural programming languages (e.g., C or assembly language). In a specific example, the third-party applications 1240 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1240 can invoke the API calls 1250 provided by the operating system 1212 to facilitate functionality described herein.

Figure 13:
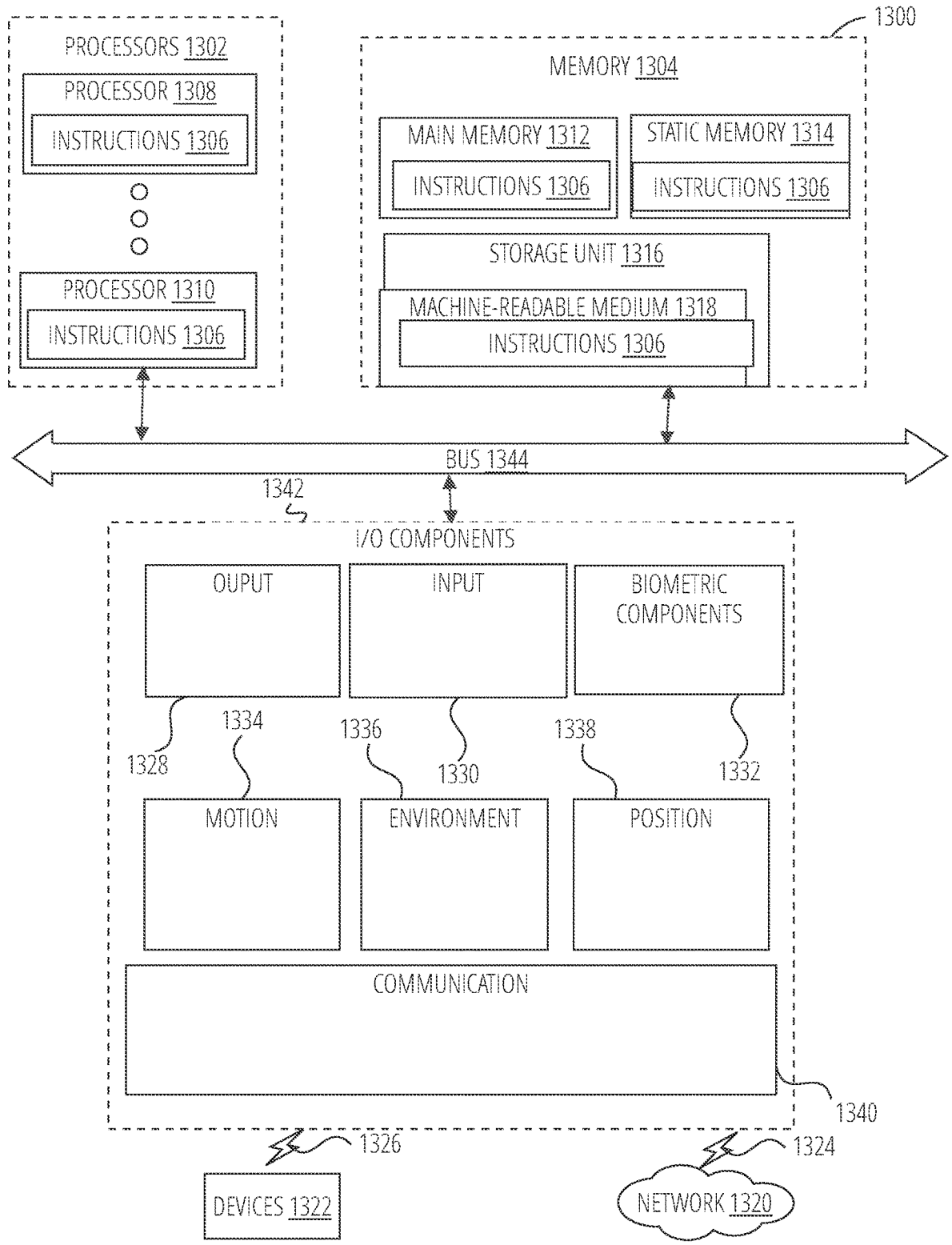
FIG. 13 is a diagrammatic representation of a machine, in the form of a computer system within which a set of instructions may be executed for causing the machine to perform any one or more of the methodologies discussed, in accordance with some examples.

FIG. 13 is a diagrammatic representation of a machine, in the form of a computer system within which a set of instructions may be executed for causing the machine to perform any one or more of the methodologies discussed, in accordance with some examples. For example, the instructions 1306 may cause the machine 1300 to execute any one or more of the methods described herein. The instructions 1306 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1306, sequentially or otherwise, that specify actions to be taken by the machine 1300. Further, while only a single machine 1300 is illustrated, the term "machine" shall also be taken to include a collection of machines that individually or jointly execute the instructions 1306 to perform any one or more of the methodologies discussed herein.

The machine 1300 may include processors 1302, memory 1304, and I/O components 1342, which may communicate with each other via a bus 1344. In an example, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1308 and a processor 1310 that execute the instructions 1306. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1306 embodying any one or more of the methodologies or functions described herein. The instructions 1306 may also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various examples, the I/O components 1342 may include output components 1328 and input components 1330. The output components 1328 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen receiving alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver component), altitude sensor components (e.g., altimeters or barometers that detect air pressure, from which altitude may be derived), orientation sensor components (e.g., magnetometers), and the like.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and memory of the processors 1302) and storage unit 1316 may store one or more sets of instructions and data structures (e.g., software) embodying or used by any one or more of the methodologies or functions described herein. These instructions (e.g., the instructions 1306), when executed by processors 1302, cause various operations to implement the disclosed examples.

The instructions 1306 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1306 may be transmitted or received using a transmission medium via the coupling 1326 (e.g., a peer-to-peer coupling) to the devices 1322.

Figure 14:
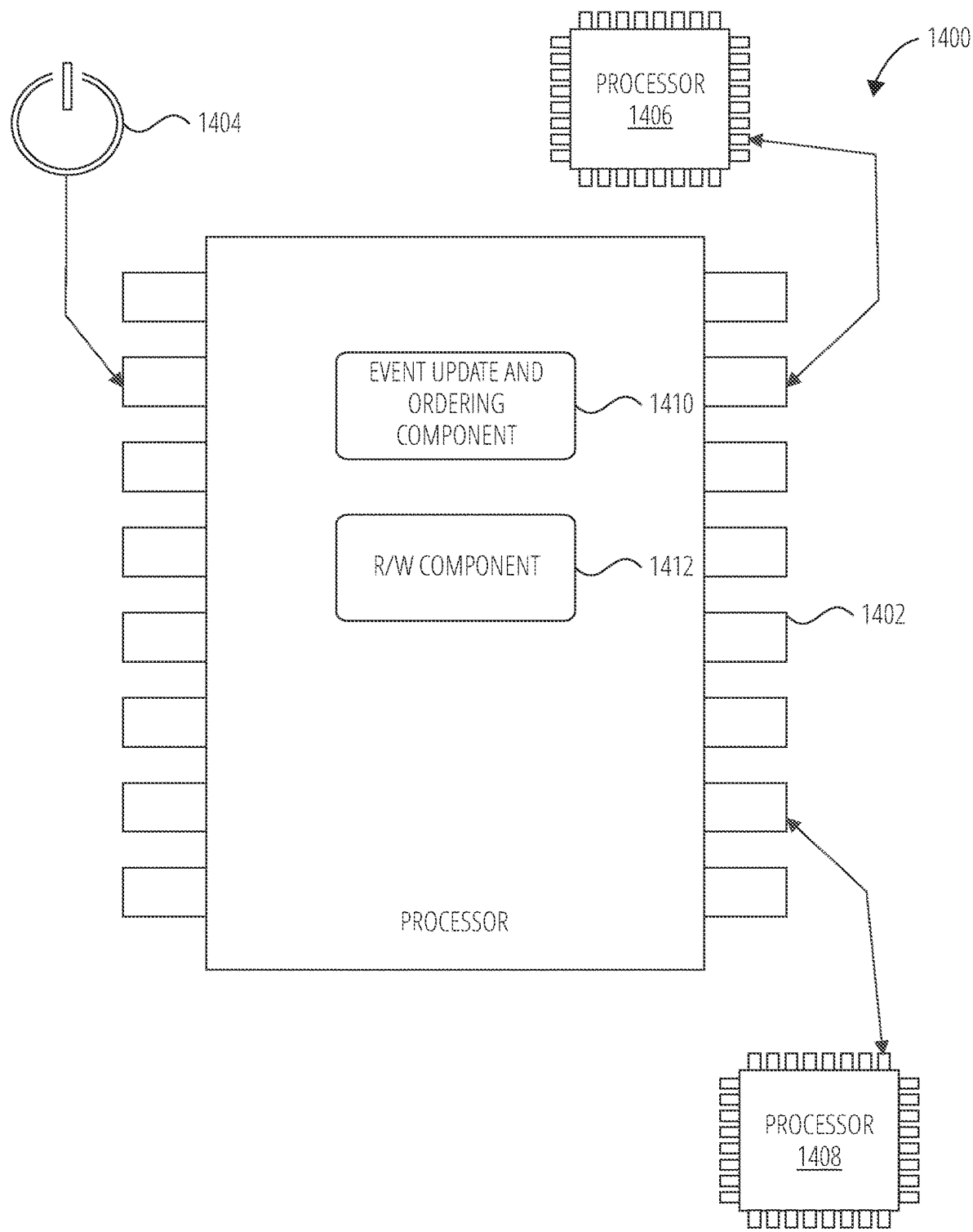
FIG. 14 is a diagrammatic representation of a processing environment, in accordance with some examples.

FIG. 14 is a diagrammatic representation of a processing environment, in accordance with some examples. The processor 1402 is shown to be coupled to a power source 1404, and to include (either permanently or temporarily instantiated) modules, namely an event update and ordering component 1410, and an R/W component 1412. The event update and ordering component 1410 operationally identifies an out-of-order event message, assigns a priority level to the out-of-order event message based on a plurality of priority rules, and optionally places the out-of-order event message in a primary or secondary queue depending on availability of missing data indicated by the out-of-order event message. The R/W component 1412 operationally delivers (e.g., fans out) an ordered stream of events to each client device being affected based on a query. As illustrated, the processor 1402 is communicatively coupled to both the processor 1406 and processor 1408, and receives queries from the processor 1406, as well as log events based on each predetermined time period from the processor 1408.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be arranged in a certain physical manner. In various example embodiments, one or more computer systems (e.g., a standalone computer system, a client computer system, or a server computer system) or one or more hardware components of a computer system (e.g., a processor or a group of processors) may be programmed by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently programmed to perform certain operations. A hardware component may be a special-purpose processor, such as a Field-Programmable Gate Array (FPGA) or an ASIC. A hardware component may also include programmable logic or circuitry that is temporarily programmed by software to perform certain operations. For example, a hardware component may include software executed by a general-purpose processor or other programmable processor. Once programmed by such software, hardware components become specific machines (or specific components of a machine) uniquely tailored to perform the programmed functions and are no longer general-purpose processors. It will be appreciated that the decision to implement a hardware component mechanically, in dedicated and permanently programmed circuitry, or in temporarily programmed circuitry (e.g., programmed by software) may be driven by cost and time considerations. Accordingly, the phrase "hardware component" (or "hardware-implemented component") should be understood to encompass a tangible entity, be that an entity that is physically constructed, permanently programmed (e.g., hardwired), or temporarily programmed (e.g., programmed) to operate in a certain manner or to perform certain operations described herein. Considering embodiments in which hardware components are temporarily programmed (e.g., programmed), each of the hardware components need not be programmed or instantiated at any one instance in time. For example, where a hardware component comprises a general-purpose processor programmed by software to become a special-purpose processor, the general-purpose processor may be programmed as respectively different special-purpose processors (e.g., comprising different hardware components) at different times. Software accordingly programs a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily programmed (e.g., by software) or permanently programmed to perform the relevant operations. Whether temporarily or permanently programmed, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
   receiving, by one or more processors, a message that includes a sequence number;
   determining that the message is an out-of-order event message based on the sequence number;
   assigning a priority level to the out-of-order event message based on a priority rule; and
   placing the out-of-order event message in a queue of messages based on the priority level.

2. The method of claim 1, wherein the queue of messages comprises a plurality of event messages, further comprising:
   sorting the plurality of event messages based on a plurality of priority levels that are assigned to the plurality of event messages.

3. The method of claim 2, wherein the plurality of priority levels indicates a chronological order in which the plurality of event messages are sent from one or more client devices.

4. The method of claim 1, wherein the out-of-order event message is a first out-of-order event message, further comprising:
   receiving a second out-of-order event message;
   identifying content data associated with the second out-of-order event message; and
   determining that the content data indicates a data item associated with the second out-of-order event message is missing.

5. The method of claim 4, further comprising:
   determining that the data item can be fetched from a database;
   fetching the data item from the database; and
   placing the second out-of-order event message in the queue of messages.

6. The method of claim 4, wherein the queue of messages is a first queue of messages, further comprising:
   determining that the data item cannot be fetched from a database; and
   placing the second out-of-order event message in a second queue of messages, the second queue of messages being associated with a lower priority ranking in processing compared to the first queue of messages.

7. The method of claim 6, further comprising:
   receiving the data item associated with the second out-of-order event message; and
   writing the second out-of-order event message to the database based on the receiving of the data item.

8. The method of claim 1, wherein the message is received via an Application Programming Interface (API).

9. The method of claim 1, wherein the out-of-order event message comprises an entity identifier associated with a user that is absent from a conversation, further comprising:
   determining a data item associated with the out-of-order event message is missing, the data item corresponding to a system notification that indicates the user has left the conversation.

10. The method of claim 9, further comprising:
    determining that a user profile associated with the user can be fetched from a database;
    fetching the user profile from the database;
    generating the data item based on the user profile; and
    writing the out-of-order event message to the database based on the data item.

11. A system comprising:
    a memory storing instructions; and
    one or more hardware processors communicatively coupled to the memory and configured by the instructions to perform operations comprising:
    receiving a message that includes a sequence number;
    determining that the message is an out-of-order event message based on the sequence number;
    assigning a priority level to the out-of-order event message based on a priority rule; and
    placing the out-of-order event message in a queue of messages based on the priority level.

12. The system of claim 11, wherein the queue of messages comprises a plurality of event messages, and wherein the operations further comprise:
    sorting the plurality of event messages based on a plurality of priority levels that are assigned to the plurality of event messages.

13. The system of claim 12, wherein the plurality of priority levels indicates a chronological order in which the plurality of event messages are sent from one or more client devices.

14. The system of claim 11, wherein the out-of-order event message is a first out-of-order event message, and wherein the operations further comprise:
    receiving a second out-of-order event message;
    identifying content data associated with the second out-of-order event message; and determining that the content data indicates a data item associated with the second out-of-order event message is missing.

15. The system of claim 14, wherein the operations further comprise:
    determining that the data item can be fetched from a database;
    fetching the data item from the database; and
    placing the second out-of-order event message in the queue of messages.

16. The system of claim 14, wherein the queue of messages is a first queue of messages, and wherein the operations further comprise:
    determining that the data item cannot be fetched from a database; and
    placing the second out-of-order event message in a second queue of messages, the second queue of messages being associated with a lower priority ranking in processing compared to the first queue of messages.

17. The system of claim 16, wherein the operations further comprise:
    receiving the data item associated with the second out-of-order event message; and
    writing the second out-of-order event message to the database based on the receiving of the data item.

18. The system of claim 11, wherein the out-of-order event message comprises an entity identifier associated with a user that is absent from a conversation, further comprising:
    determining a data item associated with the out-of-order event message is missing, the data item corresponding to a system notification that indicates the user has left the conversation.

19. The system of claim 18, further comprising:
    determining that a user profile associated with the user can be fetched from a database;
    fetching the user profile from the database;
    generating the data item based on the user profile; and
    writing the out-of-order event message to the database based on the data item.

20. A non-transitory computer-readable medium comprising instructions that, when executed by a hardware processor of a machine, cause the machine to perform operations comprising:
    receiving a message that includes a sequence number;
    determining that the message is an out-of-order event message based on the sequence number;
    assigning a priority level to the out-of-order event message based on a priority rule; and
    placing the out-of-order event message in a queue of messages based on the priority level.

* * * * *